United States Patent
Maetz et al.

(10) Patent No.: US 8,436,717 B2
(45) Date of Patent: May 7, 2013

(54) ROTATION-ACTIVATED ELECTRONIC COMPONENT

(75) Inventors: Yves Maetz, Melesse (FR); Marc Eluard, Acigne (FR); Niclas Stahl, Sartrouville (FR)

(73) Assignee: Thomson Licensing, Issy les Moulineaux (FR)

( * ) Notice: Subject to any disclaimer, the term of this patent is extended or adjusted under 35 U.S.C. 154(b) by 567 days.

(21) Appl. No.: 12/797,678

(22) Filed: Jun. 10, 2010

(65) Prior Publication Data

US 2010/0315922 A1    Dec. 16, 2010

(30) Foreign Application Priority Data

Jun. 11, 2009   (EP) .................................... 09305533

(51) Int. Cl.
| | | |
|---|---|---|
| H04Q 5/22 | (2006.01) | |
| G08B 13/14 | (2006.01) | |
| G11B 7/00 | (2006.01) | |
| G11B 3/70 | (2006.01) | |
| G11B 5/09 | (2006.01) | |
| G06K 19/00 | (2006.01) | |
| G06K 19/06 | (2006.01) | |
| H04B 17/00 | (2006.01) | |
| H04B 1/38 | (2006.01) | |

(52) U.S. Cl.
USPC ... 340/10.1; 340/10.5; 340/572.3; 340/572.8; 369/100; 369/272.1; 369/52.1; 235/487; 235/492; 455/67.11; 455/557

(58) Field of Classification Search .................. 340/10.1, 340/572.7, 572.8, 10.5, 572.1, 3.1, 12.32, 340/573.1, 10.2, 572.3; 235/375, 437, 492, 235/380, 454, 487, 488, 441, 440; 369/100, 369/103, 106, 52.1, 273; 455/412.1, 67.11, 455/557

See application file for complete search history.

(56) References Cited

U.S. PATENT DOCUMENTS

| | | | |
|---|---|---|---|
| 5,483,827 | A | 1/1996 | Kulka et al. |
| 6,150,921 | A | 11/2000 | Werb et al. |

(Continued)

FOREIGN PATENT DOCUMENTS

| | | |
|---|---|---|
| DE | 10 2006 043505 A1 | 11/2007 |
| WO | WO2005078644 | 8/2005 |

OTHER PUBLICATIONS

European Search Report dated Oct. 29, 2009 for EP Application No. EP 09 30 5533.

*Primary Examiner* — Jennifer Mehmood
*Assistant Examiner* — Mirza Alam
(74) *Attorney, Agent, or Firm* — Robert D. Shedd; Jeffrey M. Navon

(57) ABSTRACT

A rotation-activated electronic component, preferably a RFID tag mounted on or incorporated in a support that is rotated when read, e.g. a CD or DVD. The RFID tag comprises an antenna, a rotational switch and a component, advantageously a processor. The antenna is adapted to transform received RFID signals to electric energy that powers the component. In a preferred embodiment, the rotational switch is adapted to cut the circuit unless the support does not rotate at or above a certain rotational speed. Supports equipped with the RFID tag of the invention will thus respond only if they rotate sufficiently. This can avoid collisions in case more than one such RFID tag is within communication range of an antenna of a reader. In a preferred embodiment, the information returned by the component is needed for full use of the content on the support.

10 Claims, 4 Drawing Sheets

U.S. PATENT DOCUMENTS

| | | |
|---|---|---|
| 6,357,005 B1 | 3/2002 | Devaux et al. |
| 6,678,824 B1 * | 1/2004 | Cannon et al. ............... 726/22 |
| 2003/0034400 A1 * | 2/2003 | Han et al. .................. 235/487 |
| 2006/0250923 A1 * | 11/2006 | Ferren et al. ................ 369/100 |
| 2007/0072553 A1 * | 3/2007 | Barbera ................... 455/67.11 |
| 2007/0210920 A1 * | 9/2007 | Panotopoulos ............ 340/572.1 |
| 2008/0136648 A1 * | 6/2008 | Endrikhovski et al. .... 340/572.8 |
| 2008/0157974 A1 * | 7/2008 | Boss et al. ................. 340/572.3 |
| 2008/0159109 A1 * | 7/2008 | Ferren et al. ................. 369/100 |
| 2008/0199006 A1 | 8/2008 | Gandolph et al. |
| 2008/0200844 A1 | 8/2008 | Millahn et al. |
| 2008/0307884 A1 | 12/2008 | Gortler et al. |
| 2009/0240625 A1 | 9/2009 | Faith et al. |
| 2009/0299570 A1 | 12/2009 | Kammann |

* cited by examiner

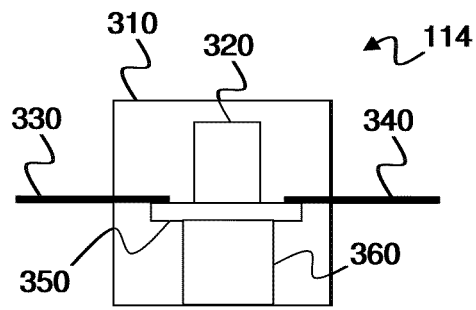 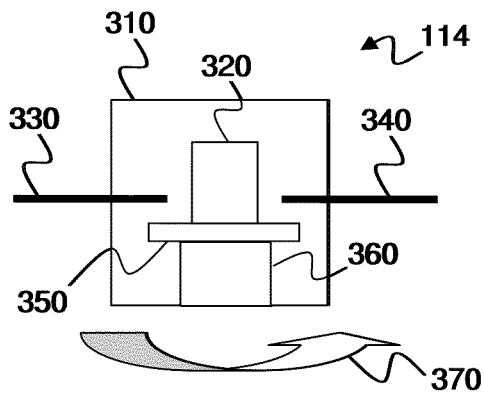
Figure 3a  Figure 3b
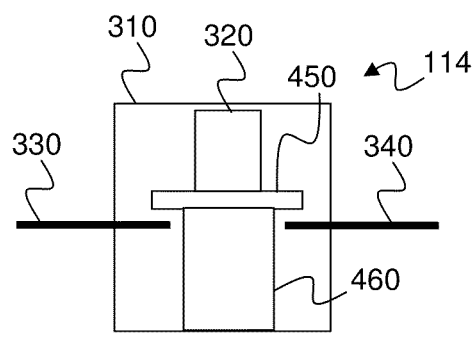 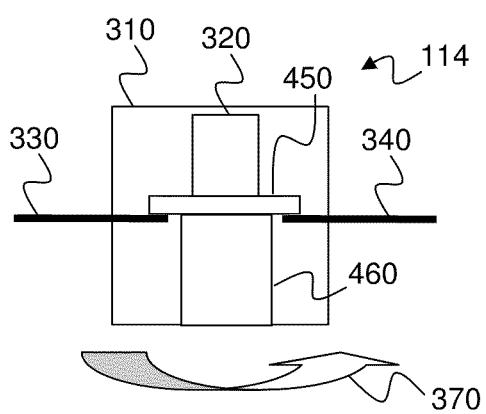
Figure 4a  Figure 4b

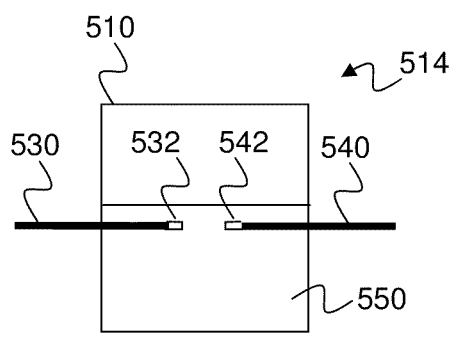
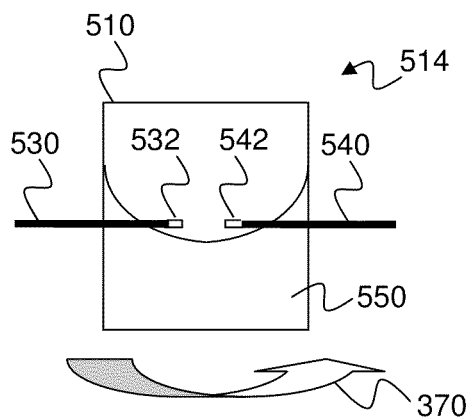
Figure 5a
Figure 5b
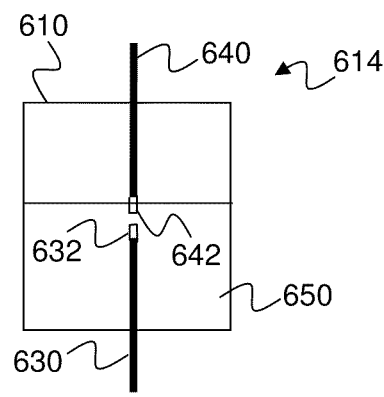
Figure 6

ROTATION-ACTIVATED ELECTRONIC COMPONENT

This application claims the benefit, under 35 U.S.C. §119 of European Patent Procedure Application 09305533.3, filed Jun. 11, 2009.

TECHNICAL FIELD

The present invention relates generally to electronic components, and more particularly to an electronic component that is activated or deactivated by rotation.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Radio-frequency identification (RFID) uses an object, an RFID tag (hereinafter "tag"), which interacts with transmitted radio waves, for example in systems for theft prevention, supply chain management or access to buildings. A typical tag comprises at least two parts: an antenna that receives and transmits a radio-frequency (RF) signal, and an integrated circuit that stores and processes information and processes the signal. Some tags, called "active", comprise a battery and are thus autonomous, while "passive" tags have no battery and therefore have to rely on external power, often the received RF signal, in order to function properly.

U.S. 2008/0307884 describes a non-contact shock sensor, which may be used to detect if an object has been submitted to shocks during transport. The sensor comprises a RFID chip, a conductor loop and a movable mass. When submitted to sufficient acceleration, the mass breaks the loop, which can thereafter be read out via the RFID chip.

U.S. 2009/0299570 describes a tire module for making tire measurements that, presumably, are sent to a processor in the vehicle on which the tire is mounted. In order to reduce the load on a battery, it is proposed to activate the module only when the tire has reached a predetermined velocity.

It has also been proposed, for example in WO 2006032613 and U.S. Pat. No. 6,357,005, to use tags on or in digital supports such as CDs and DVDs. This may for example be done in order to protect the content on the digital support (information necessary to access the content is comprised in the tag) or to store preferences regarding the playback of the content.

While this works well in most cases, there may be problems if there are more than one tag within range of the reader. This may for example be the case when a user puts DVDs on the DVD player, since the tags on these DVDs may be as close as the one in the player. One problem with this, in particular for passive tags, is that the signal power emitted by the reader has to be shared, which may lead to decreased communication quality. A further problem is that it may be difficult for the reader to know exactly which response to take account of. For example, if one DVD returns that it should be played at volume 7 and another DVD requires volume 16, the reader would not know which volume value to choose.

It can therefore be appreciated that there is a need for a solution that overcomes these problems and allows a reader to interact with the present tag without disturbance from other tags.

An obvious solution to this problem would be to shield the readers, but the present invention provides a different, surprising solution to the problem, as will be seen in the description of the preferred embodiments hereinafter.

SUMMARY OF INVENTION

In a first aspect, the invention is directed to an electronic device comprising communication means adapted to interact with an external device, a power source and a component adapted to process first information received from the communication means and to send second information intended for the external device to the communication means. The electronic device further comprises a switch adapted to enable communication via the communication means when it is subject to predetermined rotational speed and to disable communication via the communication means when it is not subject to predetermined rotational speed.

In a first preferred embodiment, the switch enables communication when the rotational speed is above a threshold value.

In a second preferred embodiment, the component comprises a processor.

In a third preferred embodiment, the communication means is an antenna. The electronic component is advantageously a Radio Frequency Identification (RFID) tag. It is also advantageous that the antenna is further adapted to function as the power source by transforming Radio Frequency (RF) signals to electric energy.

In a fourth preferred embodiment, the power source is a battery.

In a second aspect, the invention is directed to an information medium adapted to store content and comprising an electronic device according to any of the embodiments of the first aspect.

In a first preferred embodiment, access to content stored on the information medium is enhanced or enabled by information accessible from the electronic device.

In a second preferred embodiment, the information medium is an optical disc.

BRIEF DESCRIPTION OF DRAWINGS

Preferred features of the present invention will now be described, by way of non-limiting example, with reference to the accompanying drawings, in which

FIGS. 3a and 3b illustrate a first preferred embodiment of a rotational switch;

FIGS. 4a and 4b illustrate a second preferred embodiment of a rotational switch;

FIGS. 5a and 5b illustrate a third preferred embodiment of a rotational switch using conductive liquid;

FIG. 6 illustrates a fourth preferred embodiment of a rotational switch according to the invention.

DESCRIPTION OF EMBODIMENTS

A main inventive idea of the present invention is the use of a module that is controlled by rotation. An exemplary, non-limitative use that will be used hereinafter is the activation of a tag positioned on an optical medium such as a DVD.

Figure 1:
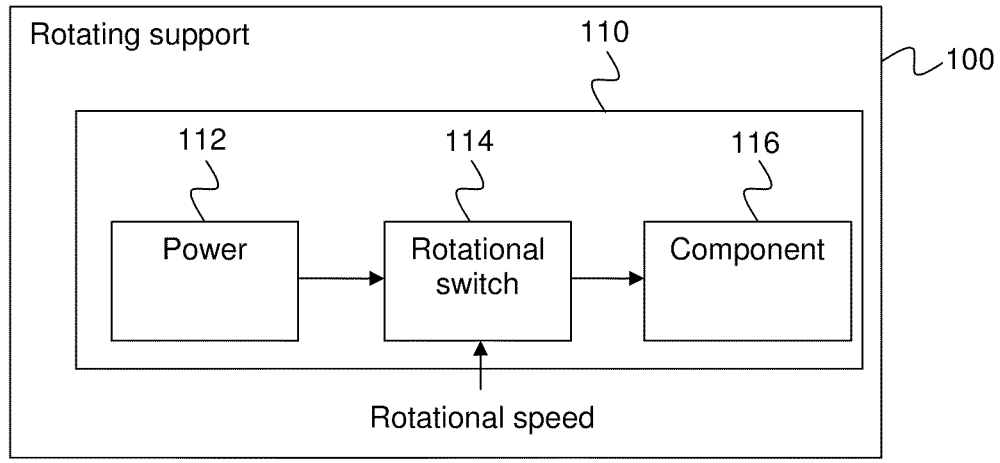
FIG. 1 illustrates the basic idea of the present invention.

FIG. 1 illustrates the basic idea of the present invention. A tag 110 is fixed to a rotating support 100, i.e. a support that may rotate. The tag 110 comprises a power source 112, a rotational switch 114 and a component 116 that preferably has processor and memory capabilities, i.e. it comprises a processor and memory. The nature of the power source 112 depends on whether the tag 110 is active or passive. If the tag is active, then it may for example be a battery; if the tag is passive, then it is preferably an antenna that transforms received RF signals to energy. The component 116 uses the energy from the power source 112 to function, e.g. to process RF signals, as discussed hereinbefore. Located between the power source 112 and the component 116 is a rotational switch 114. In a preferred embodiment, the rotational switch 114 is arranged to cut the electric contact between the power source 112 and the component 116 unless it is subject to sufficient rotational speed, as will be further described hereinafter. In a variant embodiment, the rotational switch 114 is on the contrary arranged to cut the electric contact when subject to sufficient rotational speed. It will thus be appreciated that, in the preferred embodiment, the component 116 is not powered if the rotating support does not rotate quickly enough; in the variant embodiment, the opposite applies. Naturally, when the component 116 is powered, it functions as a powered component of a prior art tag would do, notably communicating with a RFID reader.

The skilled person will appreciate that when the DVD is not rotating (or does not rotate at a sufficient speed), the rotational switch 114 cuts the power supply, which for example can mean that only the DVD in the player will respond (provided that it rotates), while DVDs lying on the player will not, no matter how close to the RFID reader they come. Thus, collisions can be avoided and the signal power can be 'reserved' for a single tag.

Figure 2:
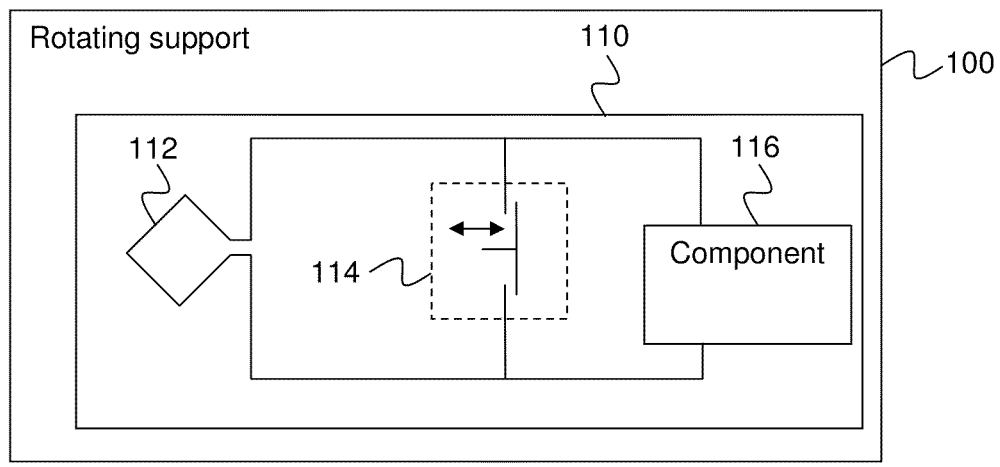
FIG. 2 schematically illustrates a tag according to a preferred embodiment of the present invention.

FIG. 2 schematically illustrates a tag according to a preferred embodiment of the present invention. The tag 210, which is fixed to or part of a rotating support 100, comprises a component 116, a power source embodied by an antenna 212, and a rotational switch 214. The antenna 212 is adapted for RF communication, i.e. transmission and reception of RF signals, and as a power supply by transforming RF signal energy to electrical energy. The rotational switch 214 comprises a first part that is movable so as to break the shortcut connection when subject to sufficient rotational energy and to establish the connection when it is not. The skilled person will appreciate that the use of a shortcut connection is preferably only used when the power source is an antenna, but not when it is a battery.

The skilled person will appreciate that it is also possible to arrange the antenna 212, the rotational switch 214 and the component 116 in series (something that holds true for any suitable embodiment).

FIGS. 3a and 3b illustrate a first preferred embodiment of a rotational switch. The first preferred embodiment, "Idle On", does not power a tag in the absence of rotational energy.

The rotational switch 114 comprises a housing 310. A first and a second electrode 330, 340 enter the housing 310 but are arranged at a distance from one another. The space between the first and the second electrode 330, 340 can be bridged by a movable conducting connector 350, which is arranged on a spring 360. A weight 320 is arranged on the connector 350, but this weight 320 may naturally be an integral part of the connector 350.

FIG. 3a shows the situation where no or insufficient rotational speed is imparted on the rotational switch 114. In this case, the connector 350 connects the first and second electrodes 330, 340 thereby causing a short circuit, which in turn means that a component arranged in parallel is not powered. In other words, when the rotational switch 114 does not rotate sufficiently, the component is idle.

FIG. 3b shows the situation where sufficient rotational speed 370 is applied to the rotational switch 114. The force imparted by the rotation on the weight 320 and the connector 350 is now greater than the opposite force provided by the spring 360. This breaks the contact between the first and second electrodes 330, 340, which means that the short circuit is no longer working. The energy provided by a power source then reaches the component, thereby powering the same.

FIGS. 4a and 4b illustrate a second preferred embodiment of a rotational switch. The second preferred embodiment, "Idle Off", powers a tag in the absence of rotational energy.

The rotational switch 414 of the second preferred embodiment resembles that of the first preferred embodiment quite a bit. The housing 310, the first and second electrodes 330, 340, and the weight 320 can be practically the same. However, the connector 450 and the spring 460 are now arranged so that no connection is made in the absence of rotational force. When such force 370 is applied, however, do the weight 320 and the connector 450 press against the opposite force provided by the spring 460, so as to bridge the gap between the first and second connector 330, 340 when the rotational speed 370 is sufficient. This completes the short circuit, thereby depriving a component of the power provided by a power source.

The skilled person will appreciate that the expressions "Idle On" and "Idle Off" apply when the rotational switch 314, 414 is arranged in parallel with component and that the opposite holds true when the rotational switch 314, 414 is arranged in series therewith.

FIGS. 5a and 5b illustrate a third preferred embodiment of a rotational switch using conductive liquid. The third preferred embodiment can be "Idle Off" if arranged in parallel with a component and "Idle On", if arranged in series.

The rotational switch 514 comprises a housing 510 adapted to receive a first and a second electrode 530, 540, each of which is isolated expect at, preferably, the end part 532, 542 located inside the housing 510. The housing 510 also comprises a conductive liquid 550, for example mercury, arranged so that it is in contact with the end parts 532, 542 regardless of the position of the rotational switch 514, as long at it is still or not subject to sufficient rotation. FIG. 5a is for illustrative purposes only; for example, the meniscus caused by the liquids adhesion to the walls of the housing 510 is not shown.

FIG. 5b illustrates the rotational switch 514 when subjected to sufficient rotational energy 370. As can be seen, the conductive liquid 550 is now 'deformed', thus creating a liquid-free space around the end parts 532, 534, thus breaking the connection between them.

FIG. 6 illustrates a fourth preferred embodiment of a rotational switch according to the invention. The fourth embodiment is relatively close to the third embodiment. The rotational switch 614 comprises the same features: a housing 610, a first and second electrode 640, 642 with non-isolated end parts 632, 642, and a conductive liquid 650. The main difference is the arrangement of the first and second electrodes 630, 640. In the fourth embodiment, they are arranged in a 'radial' way; at sufficient rotation, the second electrode 640 is completely free of liquid 650, while the first electrode 630 still is in contact therewith.

The speed for closing or opening the contact between the first and second electrodes depends on at least the following factors that can be selected to obtain a desired value:
  size of the housing,
  fluid amount and viscosity
  size and position of the electrodes
  distance of the rotational switch from the rotation centre.

A further example of a rotational switch is found in U.S. 2006/0250923. The rotational switch comprises a cantilever made up of a beam having a mass at its end. The cantilever is arranged, during rotation, to close a circuit from a voltage source to a voltage sensitive region. The voltage source is autonomous, i.e. it generates electricity using only the rotation of the disk. The voltage sensitive region is arranged to change the optical characteristics of the surface of a DVD to ensure that the data stored in the underlying area cannot be read. It will be immediately appreciated that the use of this switch, the DVD equipped with such a switch and indeed the entire technical problem is quite distant from the present invention.

Figures 7A, 7B:
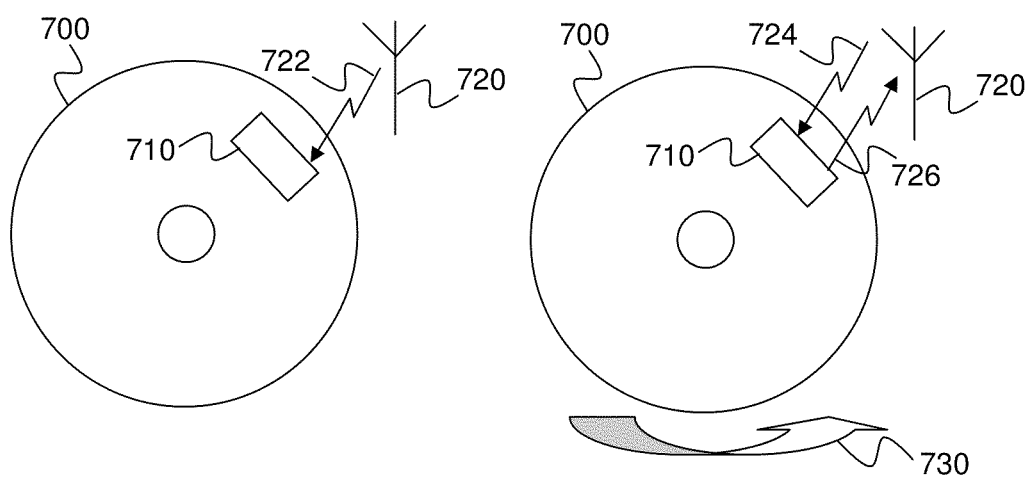
FIGS. 7a and 7b illustrate a medium equipped with a tag according to a preferred embodiment of the present invention

FIGS. 7a and 7b illustrate a medium 700, e.g. a DVD, equipped with a tag 710 according to a preferred embodiment of the present invention. The medium 700 is within communication range of an antenna 720 of an external device, such as a reader for the medium 700, e.g. a DVD player.

In FIG. 7a, it is illustrated how the antenna 720 that sends RF energy 722 towards the antenna (not shown) of the tag 710. However, as the medium does not rotate sufficiently to power the component (not shown) of the tag 710, the tag 710 does not respond.

FIG. 7b, on the other hand, illustrates the case when the medium 700 and its tag 710 are subject to sufficient rotational energy 730 for the rotational switch (not shown) to engage so as to power the component. In this case, when the antenna 720 sends a RF signal 724 to the tag 710, the latter is able to process the information in the signal 724 and send a response 726.

In a preferred embodiment, the information provided by the tag 710 enables use—possibly enhanced or improved—of the content on the medium 700. To obtain this information, the reader sends a RF signal to the tag that returns the required information. For example, the information may be a decryption key, the result of a computation performed by the tag's component (i.e. its processor), information related to the rendering of the content on the medium (such as volume, language, subtitles), or, in the case of a computer game, information about the current state of the game (such as character equipment and characteristics, available cars and race tracks . . . ).

It will be appreciated that other types of movement than rotational may be envisaged; any kind of suitable acceleration may act on the switch to enable or disable communication. For example, sufficient linear acceleration in the right direction may act upon the switch illustrated in FIGS. 3A, 3B, 4A and 4B.

It will be appreciated that the present invention can avoid ambiguity for the reader, as it will receive a single response to a RF signal that it sends while having multiple receivers within communication distance. In the case of using prior art support, it would receive multiple responses from supports within communication distance of the reader.

It will be appreciated that a tag is a convenient and economic way of manufacturing the module, as it may then be affixed to any suitable support. It is however also possible to include the tag as a part of a bigger structure, e.g. by including it in the support.

It will further be appreciated that the present invention can prevent communication collisions in environments with multiple tags, while the solution is completely transparent to the user.

Each feature disclosed in the description and (where appropriate) the claims and drawings may be provided independently or in any appropriate combination. Reference numerals appearing in the claims are by way of illustration only and shall have no limiting effect on the scope of the claims.

The invention claimed is:

1. An electronic device comprising:
   communication means adapted to interact with an external device;
   a power source;
   a component adapted to process first information received from the communication means and to send second information to the communication means, the second information being intended for the external device; and
   a switch adapted to enable communication via the communication means whenever it is subjected to predetermined rotational speed and disable communication via the communication means whenever it is not subjected to predetermined rotational speed.

2. The electronic device of claim 1, wherein the switch enables communication when the rotational speed is above a threshold value.

3. The electronic device of claim 1, wherein the component comprises a processor.

4. The electronic device of claim 1, wherein the communication means is an antenna.

5. The electronic device of claim 4, wherein the electronic component is a Radio Frequency Identification tag.

6. The electronic device of claim 4, wherein the antenna is further adapted to function as the power source by transforming Radio Frequency signals to electric energy.

7. The electronic device of claim 1, wherein the power source is a battery.

8. An information medium adapted to store content and comprising an electronic device according to claim 1.

9. The information medium of claim 8, wherein access to content stored on the information medium is enhanced or enabled by information accessible from the electronic device.

10. The information medium of claim 8, wherein the information medium is an optical disc.

* * * * *